United States Patent

[11] 3,611,076

[72] Inventor James Fred Darrow
 Henrietta, N.Y.
[21] Appl. No. 6,115
[22] Filed Jan. 27, 1970
[45] Patented Oct. 5, 1971
[73] Assignee General Electric Company

[54] OVERLOAD PROTECTION OF MULTIPLE DEVICES WITH A SINGLE CIRCUIT BREAKER
 1 Claim, 2 Drawing Figs.

[52] U.S. Cl..................................................... 317/33 SC,
 307/35, 317/27, 317/46, 317/52
[51] Int. Cl...................................................... H02h 3/08
[50] Field of Search........................................... 317/26, 27,
 46, 52, 33; 307/30, 35, 86, 125, 126, 130, 131

[56] References Cited
 UNITED STATES PATENTS
 3,171,112 2/1965 Martin........................... 317/46 X
 3,302,061 1/1967 Edmunds....................... 317/26 X
 FOREIGN PATENTS
 1,272,846 8/1961 France ......................... 317/26

Primary Examiner—J. D. Miller
Assistant Examiner—Harvey Fendelman
Attorneys—Raymond H. Quist, Allen E. Amgott, Henry W. Kaufmann, Joseph B. Forman, Frank L. Neuhauser and Oscar B. Waddell

ABSTRACT: A plurality of circuits or devices which may have different power requirements are protected against small overloads by a single circuit breaker. Overload detectors associated with each of the devices provide a circuit breaker opening signal when excessive current flows to its associated device.

INVENTOR.
James F. Darrow
BY R H Quist
ATTORNEY.

3,611,076

OVERLOAD PROTECTION OF MULTIPLE DEVICES WITH A SINGLE CIRCUIT BREAKER

BACKGROUND OF THE INVENTION

This invention relates generally to current overload protection, and more specifically to a system in which a single circuit breaker provides protection against small current overloads for a plurality of devices.

In many applications a single DC power supply is used as a source or power for a plurality of devices or circuits. It can be seen that a single circuit breaker will not provide protection against small overloads in any one device or circuit without being overly sensitive to fluctuations in power demands. On the other hand, providing separate overload protection for each of the devices complicates the system and increases its cost.

SUMMARY OF THE INVENTION

It is an object of this invention to provide protection against small overloads for a plurality of circuits or devices by utilizing a single circuit breaker.

In a preferred form of the invention, each of a plurality of circuits or devices has an associated inductive current monitoring device. An excessive current flowing to one of said circuits induces a current sufficient to cause the circuit breaker to open.

DESCRIPTION OF THE PREFERRED EMBODIMENT

Figure 1:
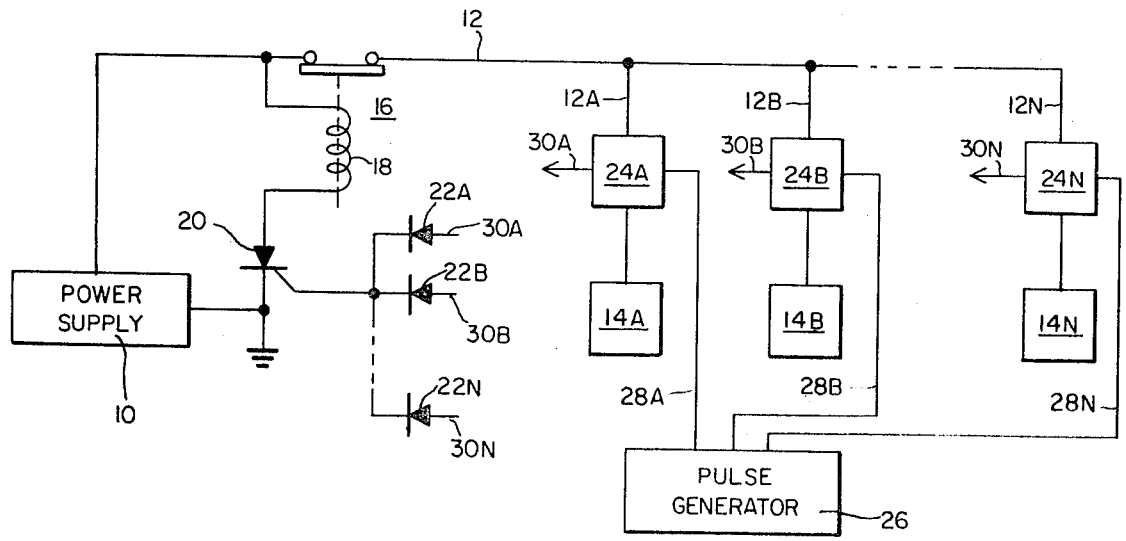
FIG. 1 is a schematic circuit diagram of the overload protective device of this invention.

Referring to FIG. 1, DC power supply 10 supplies electrical power through line 12 and feeder lines 12A–12N to devices or circuits 14A–14N. Devices 14A–14N may have equal or different power requirements which may vary from zero up to a maximum permissible load. Thus the total load on power supply 10 may vary substantially from time to time.

Circuit breaker 16 is provided to interrupt current from power supply 10 to line 12 upon the occurrence of a greater than permissible current in any one of feeder lines 12A–12N, even though the total power on line 12 is within acceptable limits.

Circuit breaker 16 is actuated by passage of current through its coil 18. Controlled rectifier 20 normally prevents current flow through coil 18, but permits such flow when a control current passes through its gate electrode.

In accordance with the invention, the necessary control current may be derived from any one of diodes 22A–22N arranged in an OR circuit. Thus circuit breaker 16 will be opened whenever any one of diodes 22A–22N experiences a voltage greater than its forward breakdown voltage.

Overcurrent detectors 24A–24N driven by pulse generator 26 through lines 28A–28N are connected to diodes 22A–22N by lines 30A–30N. Overcurrent detectors 24A–24N monitor the current in their respective feeder lines 12A–12N, and are adjusted to supply the control current to controlled rectifier 20 whenever the current being monitored becomes excessive.

Figure 2:
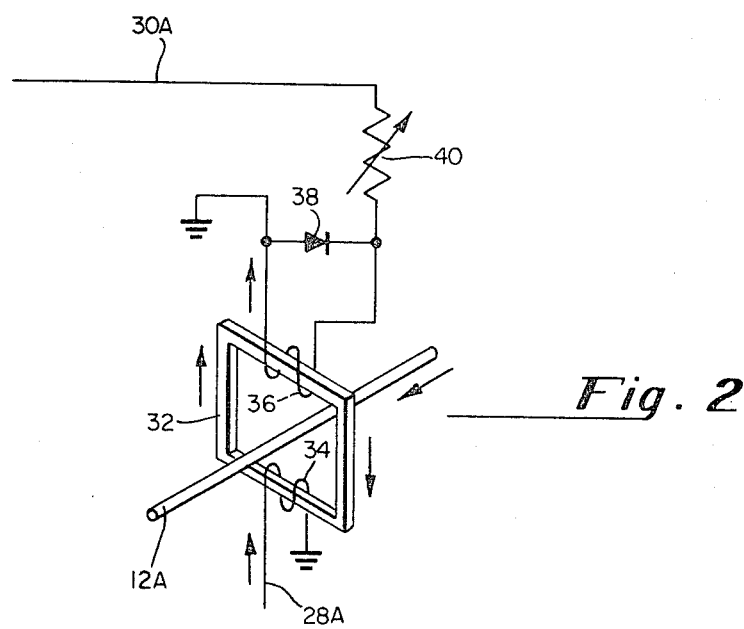
FIG. 2 is a schematic isometric of a current monitoring device which may be employed in practicing the invention.

Referring to FIG. 2, the structure of overcurrent detector 24A will now be described, it being understood that overcurrent detectors 24B–24N are similar.

Conductor 12A is the branch of power supply line 12 which provides power to device 14A. Surrounding conductor 12A is magnetic core 32. Input coil 34 on core 24 is periodically supplied with a short high intensity pulse by pulse generator 26 through line 28A. This pulse is made sufficiently large to completely magnetize core 32 in the direction indicated by the arrows, and induces a current in output coil 36 in the direction shown. Diode 38 shunted across output coil 36 causes this induced current to circulate through the coil.

Conductor 12A is supplying direct current in the direction indicated to device 14A. During the intervals between the pulses in input coil 34, the current in conductor 12A causes flux in core 32 to change in the direction opposite from that indicated by the arrows. The change in flux in core 32 induces a current in output coil 36 which is proportional to the current in conductor 12A, and in a direction opposite to that shown by the arrow. Potentiometer 40 is adjusted to produce a voltage drop such that only when the current in conductor 12A exceeds a desired amount is the induced current large enough to exceed the forward breakdown voltage of diode 22A.

Although a controlled rectifier is employed in the FIG. 1 arrangement, another component having similar characteristics may also be employed. In the same manner, while a particular overcurrent detector is illustrated in FIG. 2, other devices might be employed, see for example the Direct Current Responsive Device described in U.S. Pat. application Ser. No. 602,909, filed Dec. 19, 1966 now U.S. Pat. No. 3,490,042.

While a particular embodiment of an overload protective circuit has been shown and described, it will be obvious that changes and modifications can be made without departing from the spirit of the invention and the scope of the appended claims.

I claim:

1. In combination with a plurality of circuits or devices receiving power from a single direct current power supply, an overload protective circuit comprising:

a circuit breaker in the common power supply line for said circuits or devices;

detecting means inductively associated with each of the feeder lines supplying power from said common power line to said circuits or devices for detecting an overload in its respective feeder line, and for delivering an output signal indicating an overload;

diodes connected to the outputs of each of said detecting means and arranged in an OR circuit;

means responsive to an overload signal from any one of said diodes for actuating said circuit breaker;

said circuit breaker including a coil connected to said common power supply line; and a controlled rectifier connected in series with said coil with its gate electrode connected to said OR circuit.